United States Patent
Chen et al.

(10) Patent No.: US 12,050,127 B2
(45) Date of Patent: Jul. 30, 2024

(54) FLUORESCENCE DETECTION SYSTEM (71) Applicant: CHROMA ATE INC., Taoyuan (TW)

(72) Inventors: Hsuan-An Chen, Taoyuan (TW); Chi-Ming Wen, Taoyuan (TW)

(73) Assignee: CHROMA ATE INC., Taoyuan (TW)

( * ) Notice: Subject to any disclaimer, the term of this patent is extended or adjusted under 35 U.S.C. 154(b) by 588 days.

(21) Appl. No.: 17/476,595

(22) Filed: Sep. 16, 2021

(65) Prior Publication Data
US 2022/0136970 A1 May 5, 2022

(30) Foreign Application Priority Data

Nov. 4, 2020 (TW) .................................. 109138426

(51) Int. Cl.
G01J 3/02 (2006.01)
G01J 3/10 (2006.01)
G01J 3/44 (2006.01)

(52) U.S. Cl.
CPC ............ G01J 3/0235 (2013.01); G01J 3/0202 (2013.01); G01J 3/4406 (2013.01); G01J 2003/106 (2013.01)

(58) Field of Classification Search
CPC ...... G01J 3/0235; G01J 3/0202; G01J 3/4406; G01J 2003/106; G01J 2003/2826; G01J 3/021; G01J 3/0291; G01J 3/10; G01J 2003/1213; G02B 21/16; G02B 27/141; G02B 27/102; G02B 27/0955; G02B 27/0988; G02B 27/10; G01N 2021/6463; G01N 21/645; G01N 21/6428
See application file for complete search history.

(56) References Cited

U.S. PATENT DOCUMENTS

| 10,753,876 | B2 * | 8/2020 | Ma | G02B 27/0966 |
| 2004/0207840 | A1 * | 10/2004 | Sharpe | G02B 21/26 |
| | | | | 356/244 |
| 2006/0289786 | A1 * | 12/2006 | Taylor | G01N 21/645 |
| | | | | 356/417 |
| 2016/0026074 | A1 * | 1/2016 | Adema | G02B 7/008 |
| | | | | 362/84 |

(Continued)

FOREIGN PATENT DOCUMENTS

| KR | 102619600 | B1 * | 12/2023 | ........... G02B 27/102 |
| TW | I735371 | B * | 8/2021 | ........... G02B 27/102 |

*Primary Examiner* — David P Porta
*Assistant Examiner* — Gisselle M Gutierrez
(74) *Attorney, Agent, or Firm* — WPAT, P.C (57) ABSTRACT

A fluorescence detection system is provided and adapted to provide a selectable excitation beam to an optical transmission path for irradiation of a device under test, including a driving module, a lighting module, a first optical module and a second optical module. The driving module includes a first shaft and a second shaft parallel thereto. The lighting module is fixed to the first shaft. The first optical module and the second optical module are fixed to the second shaft. A driving operation enables the driving module to rotate the lighting module, the first optical module and the second optical module simultaneously, determining quickly a combination of one light source, one filter and one spectroscopic module on the optical transmission path, with the combination corresponding in position to the device under test, so as to reduce the volume and cost the fluorescence detection system.

9 Claims, 5 Drawing Sheets (56) References Cited

U.S. PATENT DOCUMENTS

| | | | |
|---|---|---|---|
| 2019/0064441 A1* | 2/2019 | Matsuda | H01S 3/06704 |
| 2020/0011792 A1* | 1/2020 | Wang | G01N 35/04 |
| 2020/0011796 A1* | 1/2020 | Wang | G01N 21/6402 |
| 2022/0019068 A1* | 1/2022 | Szabó | G02B 21/0076 |
| 2023/0125059 A1* | 4/2023 | Thrush | G01N 21/645 |
| | | | 435/288.7 |
| 2023/0137550 A1* | 5/2023 | Kim | G01N 21/6452 |
| | | | 250/458.1 |

* cited by examiner

FLUORESCENCE DETECTION SYSTEM

BACKGROUND OF THE INVENTION

Field of the Invention

The present disclosure relates to light detection systems and, more particularly, to a fluorescence detection system.

Description of the Prior Art

The optical system of a conventional fluorescence detection apparatus includes illumination components and image capturing components. The illumination components include a lighting module, excitation filter module, beam shaping lens module, beam splitter module, reflecting mirror, and field lens. The image capturing components include a camera, lens, radiation filter module, and field lens.

Detection of different fluorescent substances functioning as devices under test requires using different luminescence sources, excitation filters, radiation filters, and color-separation beam splitters in accordance with the radiation frequency band and the absorption frequency band of the fluorescent substances, thereby necessitating the use of a device capable of performing a switching process.

All conventional switching devices work by controlling each module or lens and thus require multiple motors, thereby increasing the required volume and cost of the apparatus. Furthermore, the control attained by multiple electrical control signals is likely to cause poor synchronicity and low switching speed.

SUMMARY OF THE INVENTION

It is an objective of the present disclosure to enhance the efficiency of a fluorescence detection system in switching excitation beams.

Another objective of the present disclosure is to reduce the volume and cost of a fluorescence detection system.

In order to achieve the above and other objectives, the present disclosure provides a fluorescence detection system, adapted to provide a selectable excitation beam to an optical transmission path for irradiation of a device under test, comprising a driving module, a lighting module, a first optical module and a second optical module. The driving module comprises a first shaft, a second shaft parallel to the first shaft, a first pivotal connection element fixed to an end of the first shaft, a second pivotal connection element fixed to one end of the second shaft, a motor, and a link belt pivotally connecting the first pivotal connection element, the second pivotal connection element and the motor, wherein the motor drives the first shaft and the second shaft to rotate synchronously through the link belt. The lighting module comprises a plurality of light sources and a first reflecting component fixed to another end of the first shaft. A light source corresponding in position to a reflecting surface of the first reflecting component is changed because of rotation of the first shaft to provide the excitation beam of the light source to the optical transmission path. The first optical module comprises a first holder and a plurality of filters fixed to the first holder. The first holder is fixed to the second shaft by a first through hole centrally disposed at the first holder, with the filters disposed around the first through hole. The second optical module comprises a second holder and a plurality of spectroscopic modules fixed to the second holder. The second holder is fixed to the second shaft by a second through hole centrally disposed at the second holder, with the spectroscopic modules disposed around the second through hole. One of the light sources, one of the filters and one of the spectroscopic modules are sequentially disposed along the optical transmission path and switched synchronously with the driving of the link belt.

In an embodiment of the present disclosure, a third pivotal connection element is disposed at an end of the motor and connected to an axle thereof, and the link belt is pivotally connected to the third pivotal connection element.

In an embodiment of the present disclosure, surfaces of the first pivotal connection element, the second pivotal connection element and the third pivotal connection element have a meshing structure each, and the meshing structure matches the pivotal connection surfaces of the first pivotal connection element, the second pivotal connection element and the third pivotal connection element pivotally connected by the link belt.

In an embodiment of the present disclosure, the pivotal connection elements are gears, and the motor is a linear motor.

In an embodiment of the present disclosure, the spectroscopic modules each have a fluorescence filter and a beam splitter. After exiting the first optical module, the excitation beam passes through the beam splitter of the spectroscopic module only.

In an embodiment of the present disclosure, the fluorescence detection system comprises a third optical module. The third optical module receives the excitation beam transmitted from the beam splitter of the second optical module and causes the excitation beam to be guided in irradiating the device under test.

In an embodiment of the present disclosure, after the fluorescence beam emitted by the device under test when irradiated by the excitation beam has exited the third optical module, the fluorescence beam follows the optical transmission path reversely to thereby pass through the beam splitter and the fluorescence filter sequentially. The beam splitter allows the excitation beam pass through and reflects the fluorescence beam to the fluorescence filter.

In an embodiment of the present disclosure, an image capturing device is disposed at a rear end of the second optical module, and is configured to receive the fluorescence beam transmitted through the fluorescence filter.

In an embodiment of the present disclosure, the motor is coupled to a controller. The controller causes the first shaft and the second shaft to rotate correspondingly according to attribute setting of the device under test to thereby determine a combination of a light source, a filter and a spectroscopic module on the optical transmission path, with the combination corresponding in position to the device under test.

Therefore, the fluorescence detection system of the present disclosure enables light sources, filters and spectroscopic modules to rotate synchronously and thereby switch synchronously. Furthermore, pivotal connection elements and two shafts of the fluorescence detection system of the present disclosure are conducive to the reduction of the volume of the fluorescence detection system, whereas the configuration of just one single motor reduces the cost of the fluorescence detection system. Moreover, synchronous rotation operation not only shortens the configured time periods of the fluorescence detection system but also enhances rotational synchronicity thereof effectively.

DETAILED DESCRIPTION OF THE EMBODIMENTS

The technical characteristics, contents, advantages and effects of the present invention will become apparent from the following detailed description taken with the accompanying drawing.

Terms, such as "a", "an" and "one", are descriptive of a unit, component, structure, device, module, system, region or zone to serve an illustrative purpose and define the scope of the present disclosure. Thus, unless otherwise specified, the terms must be interpreted to also mean "one or at least one", and their singular forms may also be plural forms.

Terms, such as "include", "comprise", "have" and the like, used herein are not restricted to essential elements disclosed herein; instead, the terms also apply to any other essential elements not definitely specified but inherently required for a unit, component, structure, device, module, system, region or zone.

Ordinal numbers, such as "first" and "second," used herein are intended to distinguish or correlate identical or similar components or structures and do not necessarily imply what order the units, elements, structures, devices, circuits, systems, locations or regions are in in terms of space. It is understood that in some situations or arrangements, the ordinal numbers may be swapped without affecting the effects of implementation of the present disclosure.

Figure 1:
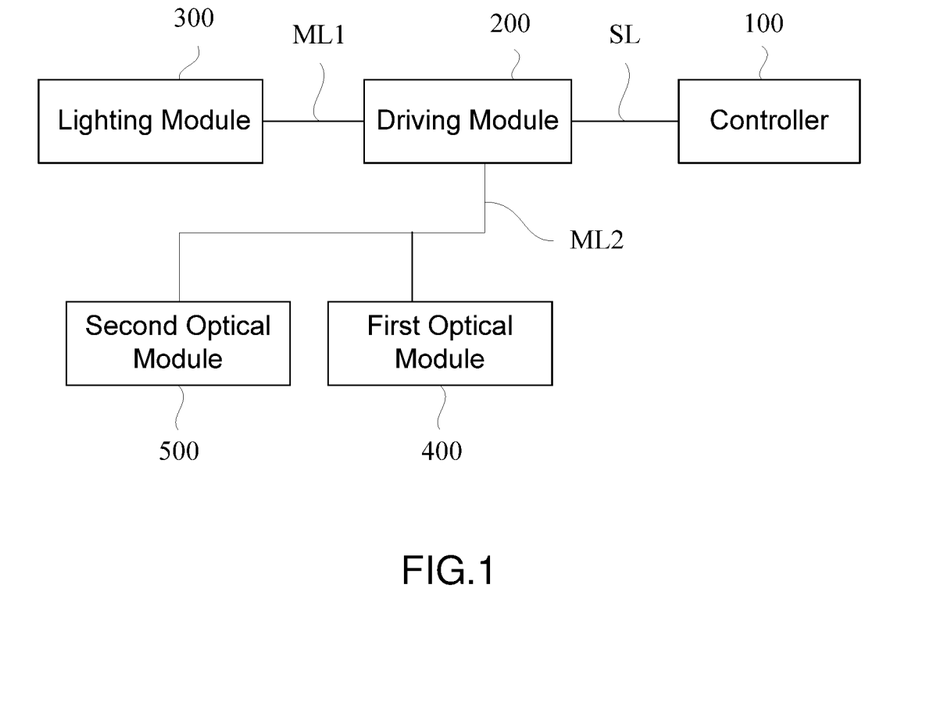
FIG. 1 is a block diagram of a fluorescence detection system according to an embodiment of the present disclosure.

Referring to FIG. 1, there is shown a block diagram of a fluorescence detection system according to an embodiment of the present disclosure. The fluorescence detection system comprises a controller 100 and a driving module 200 controlled by the controller 100 to carry out a process of fluorescence detection. The controller 100 and the driving module 200 are coupled together by a physical signal line SL; alternatively, transmission is carried out with wireless signals. The controller 100 is, for example, a computer or any other controllable electronic device.

The driving module 200 and a lighting module 300 are connected by a mechanical structure. A first optical module 400 and a second optical module 500 are connected by a mechanical structure. In this embodiment, the driving module 200 and the lighting module 300 are connected by a first rod module ML1, whereas the driving module 200, the first optical module 400 and the second optical module 500 are connected by a second rod module ML2, thereby using two rod modules to achieve connection, facilitating control based on synchronous driving, and thus reducing the complexity of optical transmission path construction. The driving relationship of the rod modules is achieved by rods and related component structures. For example, the rod modules each comprise a pivotal connection element, link belt and shaft (shown in FIG. 4 and FIG. 5).

Figure 2:
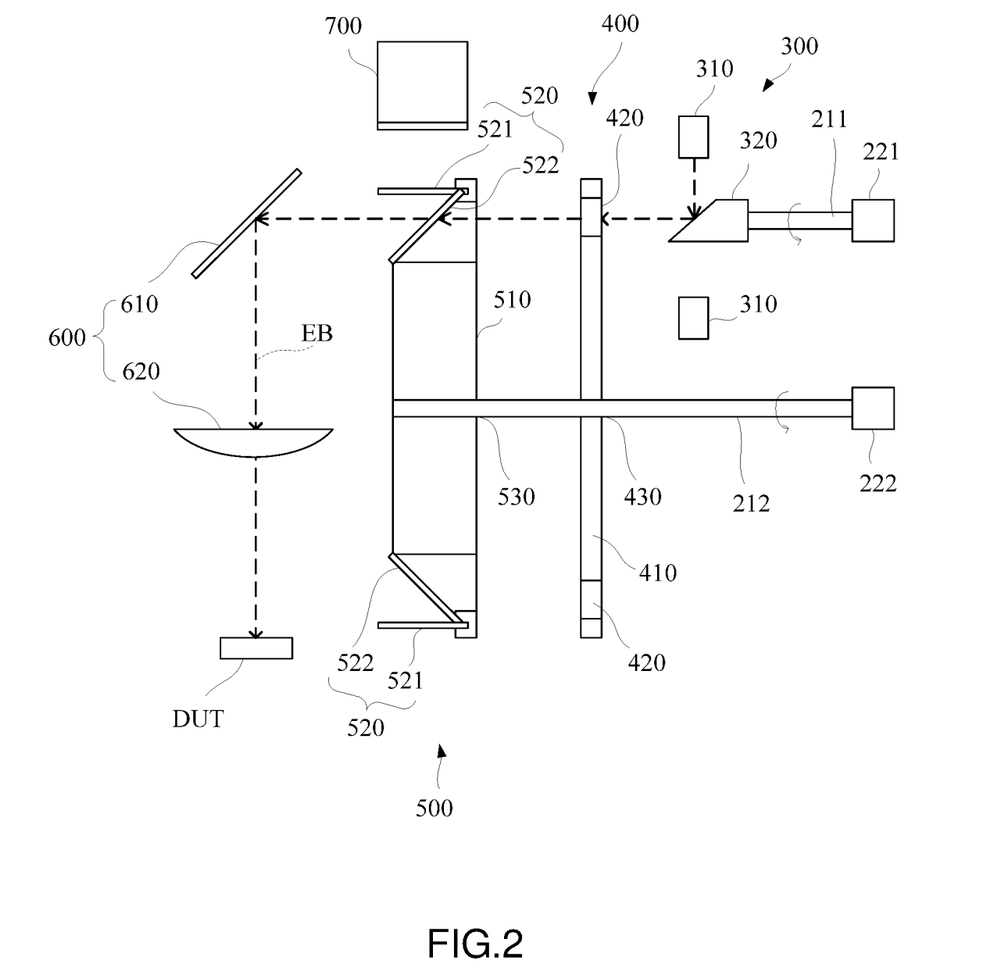
FIG. 2 is a schematic view of an optical path of a excitation beam of the fluorescence detection system according to an embodiment of the present disclosure.
Figure 3:
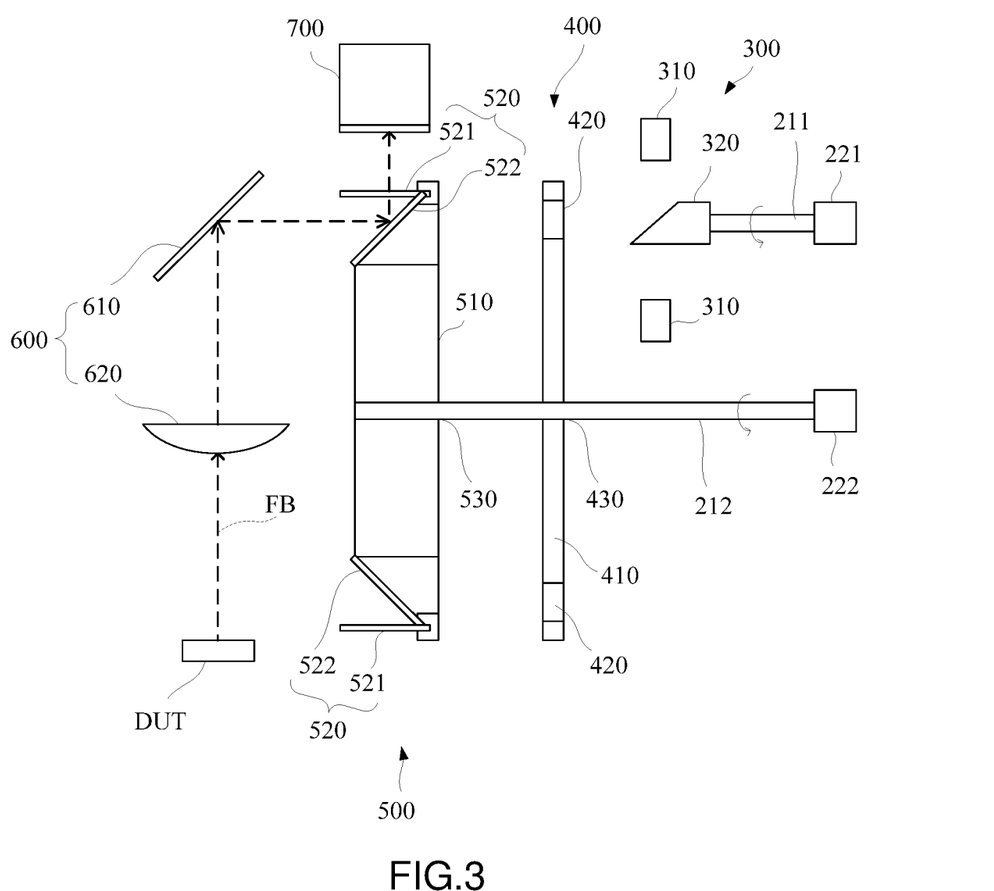
FIG. 3 is a schematic view of an optical path of a fluorescence beam of the fluorescence detection system according to an embodiment of the present disclosure.

Referring to FIG. 2, there is shown a schematic view of an optical path of a excitation beam of the fluorescence detection system according to an embodiment of the present disclosure. Referring to FIG. 3, there is shown a schematic view of an optical path of a fluorescence beam of the fluorescence detection system according to an embodiment of the present disclosure. FIG. 2 shows a luminescence optical path for exciting a device under test DUT. FIG. 3 shows the optical path of the fluorescence beam emitted by exciting the DUT. For the sake of illustration, the optical paths shown in FIG. 2 and FIG. 3 are exemplified by one optical path only.

A first reflecting component 320 is fixed to one end of a first shaft 211. A first pivotal connection element 221 is fixed to the other end of the first shaft 211. The first pivotal connection element 221 is driven to rotate the first shaft 211, and thus the first reflecting component 320 rotates synchronously to thereby correspond in position to different reflection targets (light sources). A plurality of light sources 310 are fixed in place around the first reflecting component 320. When the first reflecting component 320 is rotated so that a reflecting surface of the first reflecting component corresponds in position to one of the light sources 310, a excitation beam EB generated by the light source 310 is provided to an optical transmission path, thereby creating an optical path of the excitation beam EB shown in FIG. 2. The lighting module 300 comprises the light sources 310 and the first reflecting component 320.

The first optical module 400 and the second optical module 500 are sequentially fixed to a second shaft 212. A second pivotal connection element 222 is fixed to one end of the second shaft 212 and positioned distal to the first optical module 400 and the second optical module 500. The second pivotal connection element 222 is driven to rotate the second shaft 212, and thus the first optical module 400 and the second optical module 500 rotate synchronously, thereby allowing the excitation beam EB to pass through the corresponding optical component.

The first optical module 400 comprises a first holder 410 and a plurality of filters 420 fixed to the first holder 410. The first holder 410 is fixed to the second shaft 212 by a first through hole 430 centrally disposed at the first holder 410. The filters 420 are disposed around the first through hole 430; hence, the rotation of the second shaft 212 allows the excitation beam EB to pass through a corresponding one of the filters 420. The filters 420 are, for example, penetrable only by light beams of specific frequency band, thereby allowing the excitation beam EB to precisely match the frequency band required by the DUT.

The second optical module 500 comprises a second holder 510 and a plurality of spectroscopic modules 520 fixed to the second holder 510. The second holder 510 is fixed to the second shaft 212 by a second through hole 530 centrally disposed at the second holder 510. The spectroscopic modules 520 are disposed around the second through hole 530; hence, the rotation of the second shaft 212 allows the excitation beam EB to pass through a corresponding one of the spectroscopic modules 520.

The spectroscopic modules 520 each have a fluorescence filter 521 and a beam splitter 522. The two opposing sides of the beam splitter 522 are capable of different optical penetration and reflection. As shown in FIG. 2, the incident excitation beam EB largely penetrates the beam splitter 522 and slightly reflects off the beam splitter 522. As shown in FIG. 3, the incident fluorescence beam FB largely reflects off the beam splitter 522 and thus follows a bent optical path to thereby fall on an image capturing device 700. After exiting the first optical module, the excitation beam passes through the beam splitter 522. The beam splitter 522 is, for example, a tablet beam splitter.

The fluorescence filter 521 blocks the frequency band attributed to the incident light beam but not necessary to be detected, such that the fluorescence beam generated as a result of the excitation of detection targets (devices under test, DUT) can be correctly tested. The beam splitter 522 is on the optical transmission path of the excitation beam EB, but the fluorescence filter 521 is not. Only the reflected fluorescence beam FB can fall on the fluorescence filter 521. Therefore, after exiting the first optical module 400, the excitation beam EB passes through the beam splitter 522 of the spectroscopic module 520 only.

A third optical module 600 receives the excitation beam EB which has exited the beam splitter 522 of the second optical module 500 and causes the excitation beam EB to be guided in irradiating the DUT. For instance, the third optical module 600 has a reflecting mirror 610 and a lens 620. The reflecting mirror 610 alters the optical transmission path of the excitation beam EB in such a manner as to cause the excitation beam EB to fall on the DUT. The lens 620 expands the excitation beam EB to form a sufficiently large irradiation area on the DUT.

After the fluorescence beam FB emitted by the DUT has exited the third optical module 600, the fluorescence beam FB follows the optical transmission path reversely to thereby pass through the beam splitter 522 and the fluorescence filter 521 sequentially and then fall on the image capturing device 700. Therefore, the beam splitter 522 allows the excitation beam EB pass through and reflects the fluorescence beam FB to the fluorescence filter 521.

Figure 4:
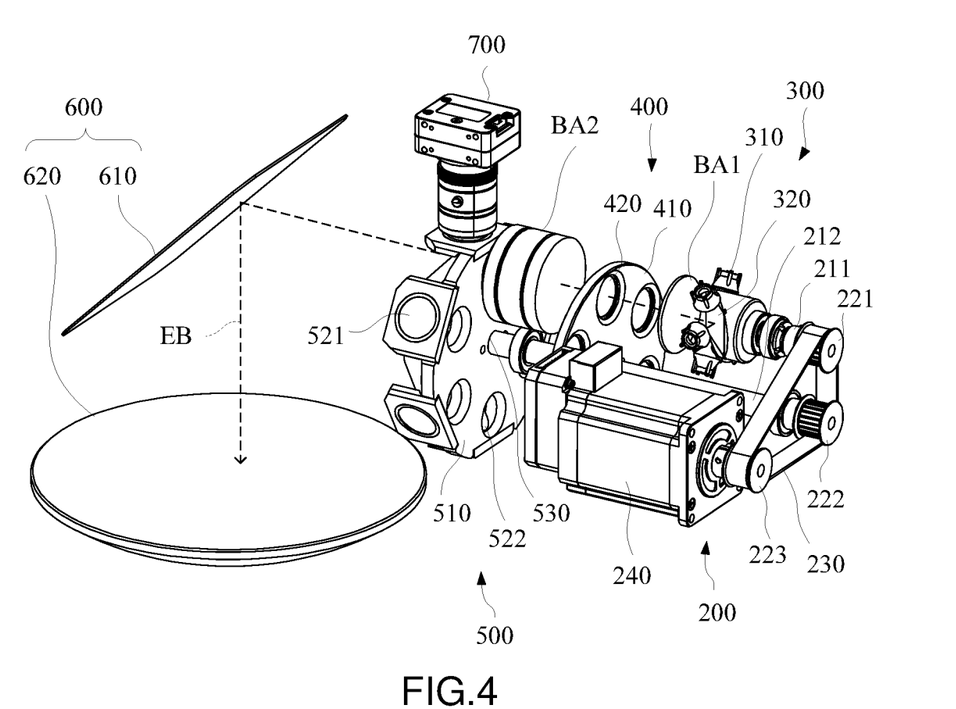
FIG. 4 is a perspective view of the fluorescence detection system taken from the first angle of view according to another embodiment of the present disclosure.
Figure 5:
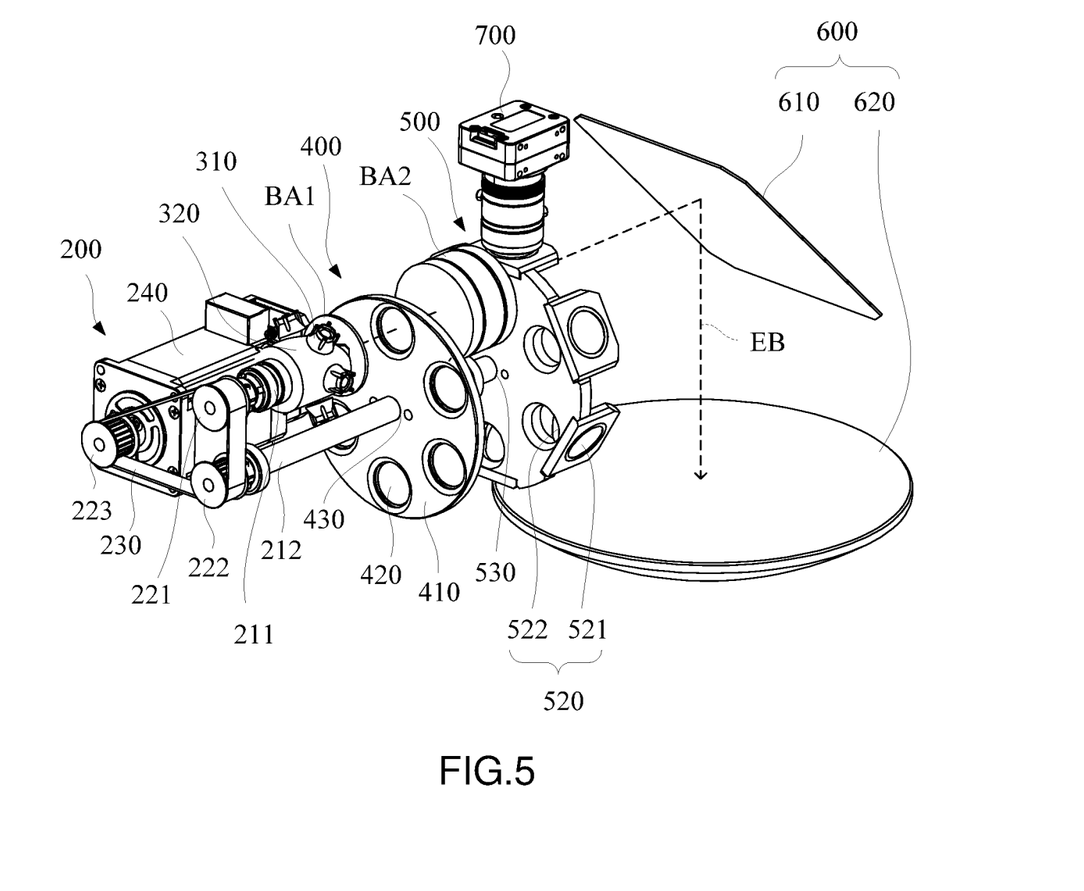
FIG. 5 is a perspective view of the fluorescence detection system taken from the second angle of view in the embodiment illustrated by FIG. 4.

Referring to FIG. 4, there is shown a perspective view of the fluorescence detection system taken from the first angle of view according to another embodiment of the present disclosure. Referring to FIG. 5, there is shown a perspective view of the fluorescence detection system taken from the second angle of view in the embodiment illustrated by FIG. 4. The constituent elements shown in FIG. 4 and FIG. 5, which are the same as the constituent elements disclosed in the embodiment illustrated by FIG. 2 and FIG. 3, are intended to define another embodiment of the fluorescence detection system in terms of the spatial relationship between the constituent elements and show them from a perspective angle of view, but not showing the DUT and the other structural features.

Regarding the driving module 200, a third pivotal connection element 223 disposed at one end of the motor 240 and connected to the axle thereof transmits the rotational power outputted by the motor 240 to the first pivotal connection element 221 and the second pivotal connection element 222 through a link belt 230, thereby driving the rotation of the first shaft 211 and the second shaft 212. The surfaces of the first pivotal connection element 221, the second pivotal connection element 222 and the third pivotal connection element 223 each have a meshing structure shown in FIG. 4 and FIG. 5. The meshing structure matches the pivotal connection surfaces of the first pivotal connection element 221, the second pivotal connection element 222 and the third pivotal connection element 223 pivotally connected by the link belt 230. In an embodiment, the pivotal connection elements 221, 222, 223 are gears, whereas the motor 240 is a linear motor.

The first shaft 211 rotates and thus drives the first reflecting component 320. The first reflecting component 320 corresponds in position to the light sources 310 and thereby reflects light beams emitted by the light sources 310, the light beams thus reflected enter the optical transmission path to become the excitation beam EB. Consequently, the rotation of the first shaft 211 determines the light sources (the light sources 310) of the excitation beam EB. The light sources 310 have their respective frequency bands whereby the frequency band of the excitation beam EB is selected.

The second shaft 212 rotates and thus drives the first optical module 400 and the second optical module 500. The first optical module 400 enables the excitation beam EB to be precisely matched to the frequency band required by the DUT. The second optical module 500 processes the fluorescence beam FB emitted from the DUT. Beam shapers BA1, BA2 (in the embodiment illustrated by FIG. 4 and FIG. 5) for adjusting light beams are disposed along the optical transmission path of the excitation beam EB to adjust the expanding or focusing of the excitation beam EB on the optical transmission path according to specific requirements.

In conclusion, one of the light sources, one of the filters, and one of the spectroscopic modules are disposed along the optical transmission path sequentially. The driving of the first shaft 211, the second shaft 212 and the link belt 230 synchronizes the switching of the light sources, the switching of the filters, and the switching of the spectroscopic modules to optimize the space taken up by the driving module 200 in the fluorescence detection system and reduce the anterior-posterior distance. The synchronous driving is achieved with one single motor 240, such that the time periods which the detection system allocates to the light sources can be shortened. Furthermore, rotational synchronicity is effectively enhanced with three pivotal connection elements and one link belt.

The present disclosure is disclosed above by preferred embodiments. However, persons skilled in the art should understand that the preferred embodiments are illustrative of the present disclosure only, but shall not be interpreted as restrictive of the scope of the present disclosure. Hence, all equivalent changes and replacements made to the aforesaid embodiments shall fall within the scope of the present disclosure. Accordingly, the legal protection for the present disclosure shall be defined by the appended claims.

What is claimed is:

1. A fluorescence detection system, adapted to provide a selectable excitation beam to an optical transmission path for irradiation of a device under test, comprising:

a driving module comprising a first shaft, a second shaft parallel to the first shaft, a first pivotal connection element fixed to an end of the first shaft, a second pivotal connection element fixed to one end of the second shaft, a motor, and a link belt pivotally connecting the first pivotal connection element, the second pivotal connection element and the motor, wherein the motor drives the first shaft and the second shaft to rotate synchronously through the link belt;

a lighting module comprising a plurality of light sources and a first reflecting component fixed to another end of the first shaft, wherein the light source corresponding in position to a reflecting surface of the first reflecting component is changed because of rotation of the first shaft to provide the excitation beam of said light source to the optical transmission path;

a first optical module comprising a first holder and a plurality of filters fixed to the first holder, the first holder being fixed to the second shaft by a first through hole centrally disposed at the first holder, with the filters disposed around the first through hole; and a second optical module comprising a second holder and a plurality of spectroscopic modules fixed to the second holder, the second holder being fixed to the second shaft by a second through hole centrally disposed at the second holder, with the spectroscopic modules disposed around the second through hole, wherein one of the light sources, one of the filters and one of the spectroscopic modules are sequentially disposed along the optical transmission path and switched synchronously with the driving of the link belt.

2. The fluorescence detection system of claim 1, wherein a third pivotal connection element is disposed at an end of the motor and connected to an axle thereof, and the link belt is pivotally connected to the third pivotal connection element.

3. The fluorescence detection system of claim 2, wherein surfaces of the first pivotal connection element, the second pivotal connection element and the third pivotal connection element have a meshing structure each, and the meshing structure matches the pivotal connection surfaces of the first pivotal connection element, the second pivotal connection element and the third pivotal connection element pivotally connected by the link belt.

4. The fluorescence detection system of claim 3, wherein the pivotal connection elements are gears, and the motor is a linear motor.

5. The fluorescence detection system of claim 1, wherein the spectroscopic modules each have a fluorescence filter and a beam splitter, wherein, after exiting the first optical module, the excitation beam passes through the beam splitter of the spectroscopic module only.

6. The fluorescence detection system of claim 5, further comprising a third optical module for receiving the excitation beam transmitted from the beam splitter of the second optical module and causing the excitation beam to be guided in irradiating the device under test.

7. The fluorescence detection system of claim 6, wherein, after a fluorescence beam emitted by the device under test when irradiated by the excitation beam has exited the third optical module, the fluorescence beam follows the optical transmission path reversely to thereby pass through the beam splitter and the fluorescence filter sequentially, wherein the beam splitter allows the excitation beam pass through and reflects the fluorescence beam to the fluorescence filter.

8. The fluorescence detection system of claim 7, wherein an image capturing device is disposed at a rear end of the second optical module, and is configured to receive the fluorescence beam transmitted through the fluorescence filter.

9. The fluorescence detection system of claim 1, wherein the motor is coupled to a controller, and the controller causes the first shaft and the second shaft to rotate correspondingly according to attribute setting of the device under test to thereby determine a combination of a said light source, a said filter and a said spectroscopic module on the optical transmission path, with the combination corresponding in position to the device under test.

* * * * *